May 3, 1932.  A. C. BROWN  1,856,088

VALVE

Filed June 22, 1925

Inventor:
Albert C. Brown
By Munday, Clarke & Carpenter
Attys.

Patented May 3, 1932

1,856,088

UNITED STATES PATENT OFFICE

ALBERT C. BROWN, OF CHICAGO, ILLINOIS

VALVE

Application filed June 22, 1925. Serial No. 38,640.

This invention relates in general to valves, and more particularly to that type of valve used in faucets and the like.

An important object of the invention is to produce a valve actuated by a rotatable valve stem having internal means limiting the rotary movement required for opening and closing said valve to a predetermined arc, to prevent rotation of the stem after full open position.

Another object of the invention is to provide such a device having means for adjusting the point with respect to the rotation of the valve stem at which the closed position may occur, thus making it possible to determine the position of the handle relative to the position of the faucet when the valve is closed and to adjust this handle upon occasion to insure the closing of the valve at this point. In a construction of this type, it is possible to adjust the handle to suit surrounding conditions, as a complete rotation of the valve is at no time necessary and adjustment to close the valve at any desired point is possible.

Another important object is to provide such a device that may be economically manufactured, and that will be substantially rigid having wear-resisting qualities and symmetrical balance.

Another important object is to provide a means for limiting the movement of a valve control member by parts positioned within the valve body to insure against damage and to eliminate external obstructions.

Numerous other objects and advantages of the invention will be apparent as it is better understood from the following description, which, taken in connection with the accompanying drawings, discloses a preferred embodiment thereof.

Referring to the drawings.

Figure 1:
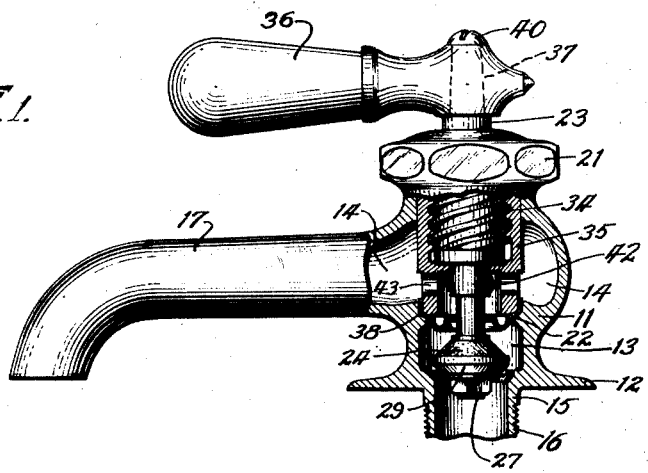
Fig. 1 is an elevation with parts broken away of a device embodying my invention.
Figure 4:
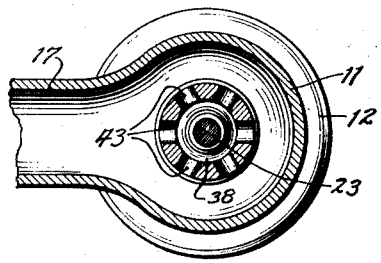
Fig. 4 is a section taken substantially on line 4—4 of Fig. 2.
Figure 2:
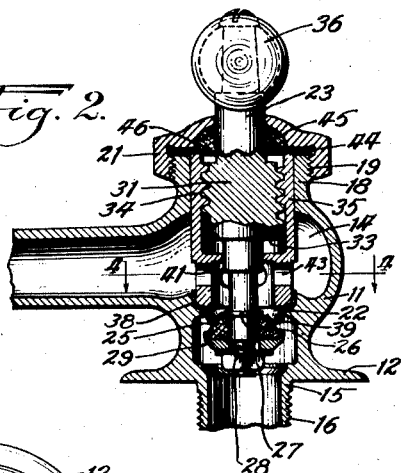
Fig. 2 is a sectional view showing the device in closed position.

To illustrate my invention, I have shown a spherical or globe valve body 11 having a circular flanged base 12 and inlet and outlet chambers 13 and 14. A tubular portion 15 extends below the base flange 12 and is threaded at 16 for engagement with suitable pipe fittings for conducting liquid under pressure from a supply source to the inlet chamber 13. The discharge from the outlet chamber may be any suitable conductor or number of conductors such as are common in pipe fittings. In the present instance, I have shown an outwardly and downwardly extending tubular portion or faucet outlet 17. An annular portion 18 extends up from the body 11 and is threaded at 19 to receive a packing nut 21. An annular flange 22 between the inlet and outlet chambers 13 and 14 provides a seat for the valve mechanism which will now be described.

A rotatable valve stem 23 extends through the packing nut 21, the outlet chamber 14 and into the inlet chamber 13. A plunger or gasket 24 which is or may be formed substantially annular and having a beveled face 25 is secured to the end of the stem 23 extending into the inlet chamber, against the collar 26 formed integral with the stem, by a nut 27 taking onto a threaded portion 28 at the end of the stem. An annular cup 29 is interposed between the nut 27 and the gasket 24 and provides a retainer for the gasket to prevent spreading thereof. Any suitable means or device may be provided to rotate the valve stem, and in the present instance, I provide a handle 36, which is formed to embrace a square portion 37 of the stem 23 and is secured thereto by a screw 40. A removable and interchangeable valve seat 38 is or may be provided, which is preferably of soft metal and is or may be formed substantially annular having a curled portion 39 providing a seat for the gasket 24 and having portions extending upwardly, outwardly and again upwardly therefrom to provide a seat for the bushing 35. The flange 22 of the body 11 is formed in accordance with the form of the valve seat 38 and provides a seat therefor. An enlarged portion of the stem 23 provides a shoulder 33 and is provided with suitable threads 34 for engagement with a threaded bushing 35. The bushing 35 is formed substantially cylindrical and is provided with an inwardly extending dividing wall or flange 41 which embraces a portion 42 of the stem 23 to provide a substantially liquid tight joint and to provide a stop for the shoulders 33. A plurality of apertures 43 are provided in the lower portion of the bushing 35 to permit the passage of a liquid into the outlet chamber 14. An annular gasket 44 and a packing 45 of a suitable packing material to provide a liquid tight joint is provided in the packing nut 21. A metal washer 46 is positioned between the bushing 35 and the packing nut 21.

To assemble the valve, the bushing 35, the valve seat 38, gasket 24 and cup 29 are assembled on the stem 23. This assembly is then inserted in the valve body, and the metal washer 46, gasket 44 and packing 45 are positioned over the valve stem. The packing nut 21 is then positioned and turned down on the threads 19 to secure the valve parts in position. The operating handle 36 may then be secured to the top of the valve stem.

Figure 3:
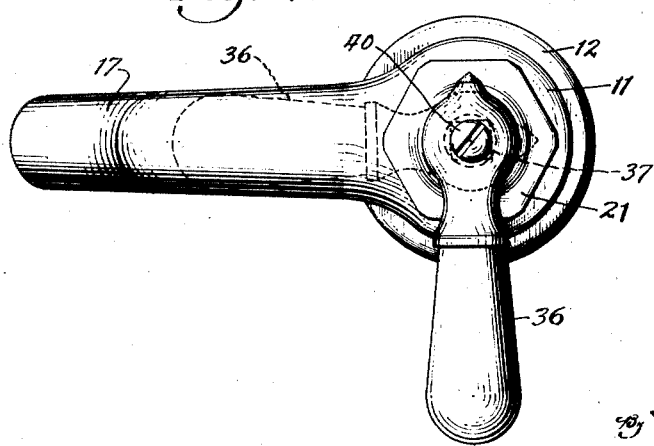
Fig. 3 is a plane view of the device.

In operation, the direction of rotation to open and close the valve is determined by the threads 34 and companion threads in the bushing 35 which may be either left or right hand threads as desired. In the present instance, I have shown right hand threads so that (viewing Fig. 3) movement to open the valve is in a clockwise direction, and movement to close it is in a counter-clockwise direction. The length of the enlarged portion 31 of the stem 23 is determined by the pitch and the required length of the threads 34, the length of the bushing above the dividing wall 41 and the desired amount of movement of the handle 36. I have shown the movement of the handle 36 as limited to 90 degrees. The full line illustration (Fig. 3) shows the handle 36 in closed position and the dotted line illustration shows the open position. It is to be understood, however, that the flow of liquid is also controllable, and that the handle may be stopped at any position between the limits shown in Fig. 3 to restrict the flow as desired. Movement of the handle and stem 23 in a clockwise direction is limited by the shoulder 33 of the enlarged portion 31 of the stem 23 engaging the flange 41 of the bushing 35, and movement in a counter-clockwise direction is limited by the gasket 24 engaging the seat 38. It will be noted that the bushing 35 is rotatably positioned in the valve body 11 and clamped in position by the packing nut 21 through the washer 46, the bushing being seated against the removable valve seat 38, which is in turn seated against the flange 22 in the body 11, and that by positioning the bushing 35 the point relative to the rotation of the valve stem at which open and closed positions will occur is determined. These points may be at or between any of the 360 degrees of a complete revolution.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a valve assembly, the combination of a valve housing, a removable valve seat, a valve stem having an enlarged threaded portion adjacent the handle end and spaced apart from the valve seat, and a bushing loosely mounted in the housing and having threaded engagement with the valve stem said bushing having an internal annular flanged portion adapted for engaging the enlarged threaded portion of the valve stem to limit its longitudinal motion, said bushing also securing the valve seat in position.

2. In a valve assembly, the combination of a valve housing, a valve stem having a peripheral shoulder, and a valve plunger arranged for valve controlling movement within the housing, a control handle for rotating the stem, and a bushing being seated in the housing and having threaded engagement with the valve stem within the housing to provide downward longitudinal valve opening movement of the valve stem upon rotation thereof within the bushing, said bushing having an internal inwardly disposed flange arranged to engage the shoulder of the valve stem to limit the downward longitudinal valve opening movement of the stem whereby to limit the corresponding rotational movement of the control handle.

3. In a valve, a valve housing, a removable valve seat having an annular inwardly projecting resilient portion positioned within the housing, a stem having a valve engageable with the resilient projecting portion of said seat, a control handle having an open position and a closed position with respect to the housing and being rotatable therein, and a rotatable bushing loosely seated in the housing and clamping the valve seat in position, said bushing being further adapted to embrace a portion of the stem within the housing to provide means for adjusting the open and closed position of the control handle by rotating the bushing.

4. In a valve structure the combination of a housing containing a valve stem and a removable valve seat, a bushing slidable and rotatable in said housing and having threaded engagement with said valve stem, a portion of said bushing engaging said seat to removably clamp the same in position, said valve seat having an inwardly projecting bendable valve-engaging portion, and a valve carried by said stem and movable therewith relative to said seat.

5. In a valve structure the combination of a housing containing a valve seat, a bushing slidable and rotatable in said housing and enclosing a valve stem, a valve and an operating handle carried by said stem, one portion of said bushing having threaded engagement with said stem to obtain movement of the latter towards and away from said seat when the valve stem is rotated on its axis, and means on said bushing for limiting movement of the stem in one direction when the operating handle is in one position, the rotatable mounting of said bushing permitting adjustment of its threaded engagement with the valve stem to insure complete closing and opening of the valve when the operating handle has been moved to predetermined open and closed positions.

6. In a valve, a valve housing, a valve seat in said housing, a valve beneath said valve seat, a valve stem extending up through said valve seat and having engagement thereabove, said valve stem having an enlarged portion adjacent the handle end and spaced apart from the valve seat, and a bushing arranged within the housing and embracing the enlarged part of said valve stem and in threaded engagement therewith, said bushing extending radially inwardly beneath the enlarged part of said valve stem to limit opening movement of the valve.

ALBERT C. BROWN.